United States Patent [19]
Lee

[11] Patent Number: 4,940,187
[45] Date of Patent: Jul. 10, 1990

[54] SYSTEMATIC EQUIPMENTS FOR RECYCLING RAW MATERIALS FROM WASTE WIRES

[76] Inventor: Tocew Lee, P.O. Box 10160, Taipei, Taiwan

[21] Appl. No.: 426,980

[22] Filed: Oct. 26, 1989

[51] Int. Cl.⁵ ............................................. B02C 21/00
[52] U.S. Cl. ...................... 241/79.1; 209/3; 209/172.5; 241/81; 241/101.4; 241/DIG. 38
[58] Field of Search ............... 15/88; 209/3, 192, 203, 209/172.5; 241/3, 24, 20, 79, 79.1, 101.4, 81, DIG. 38

[56] References Cited

U.S. PATENT DOCUMENTS

| | | | |
|---|---|---|---|
| 3,074,653 | 1/1963 | Schorsch | 241/79.1 X |
| 3,582,004 | 6/1971 | Lenz et al. | 241/20 |
| 3,705,694 | 12/1972 | Slocum | 241/79 X |
| 3,749,322 | 7/1973 | Reynolds | 241/24 |
| 4,362,276 | 12/1982 | Morey | 241/DIG. 3 B X |
| 4,739,533 | 4/1988 | Lee | 15/88 |

Primary Examiner—Mark Rosenbaum

[57] ABSTRACT

A set of systematic equipments for recycling raw materials such as: copper, ferrous material, and different plastic materials from waste wires includes: a charging conveyor having a cutter for cutting waste wires to a predetermined length, at least a vertical conveyor for unloading the waste wires into at least a vertical scraping machine for scraping plastic coatings from the insulated copper wires, at least a screening machine following said scraping for screening the fine wire scraps, a horizontal crushing machine for crushing the coarse wire scraps into particles or powder of copper, ferrous and plastic materials, a magnetic separator for separating the ferrous material and non-ferrous material of copper and plastic materials, a classifier for separating the copper and plastic materials, and a wet gravity separator for further separating the different plastic materials having different densities and floating heights in a tank of the gravity separator.

6 Claims, 5 Drawing Sheets

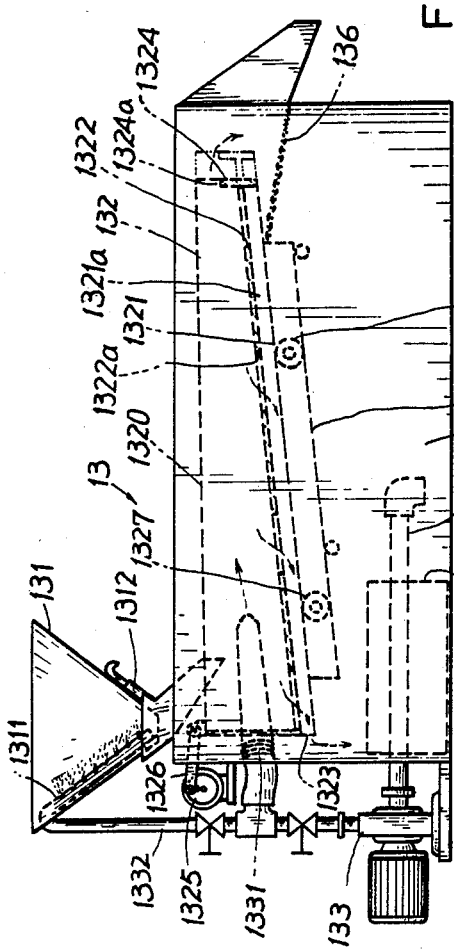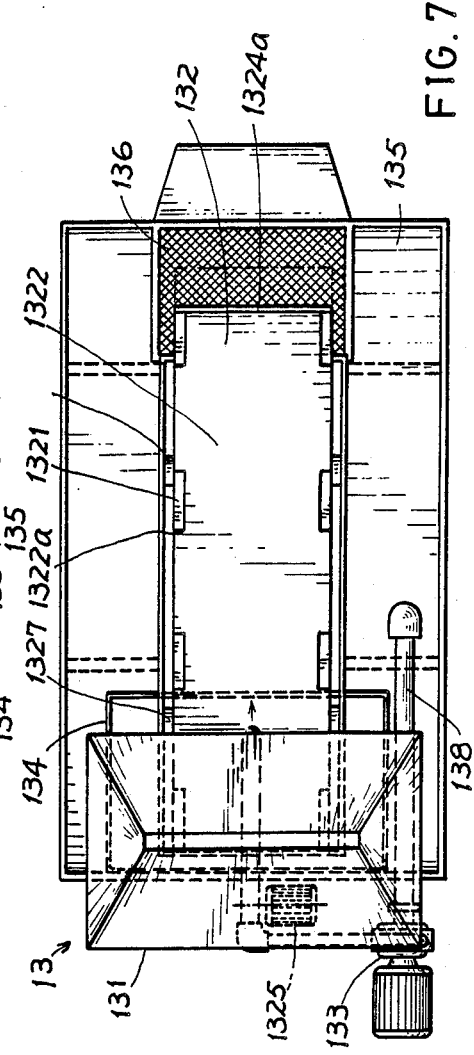

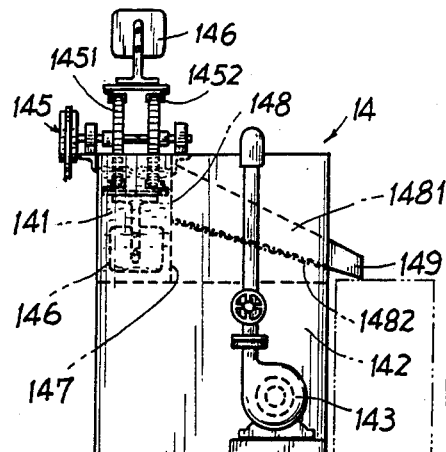
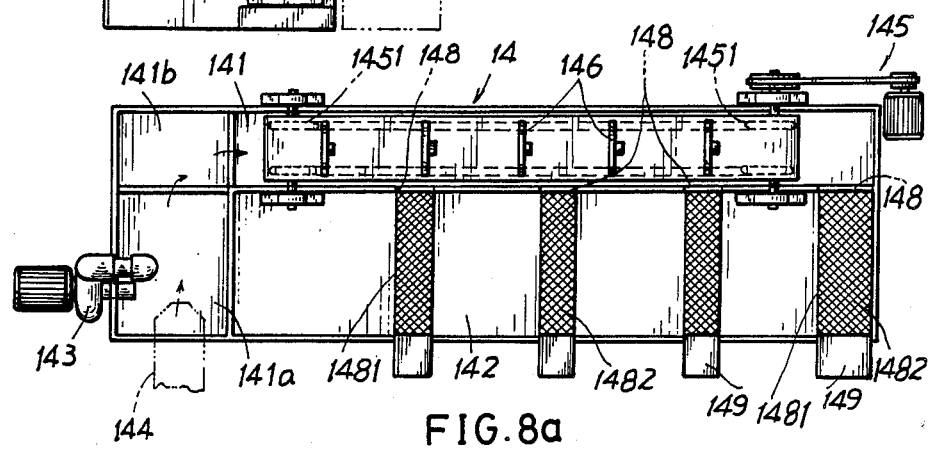
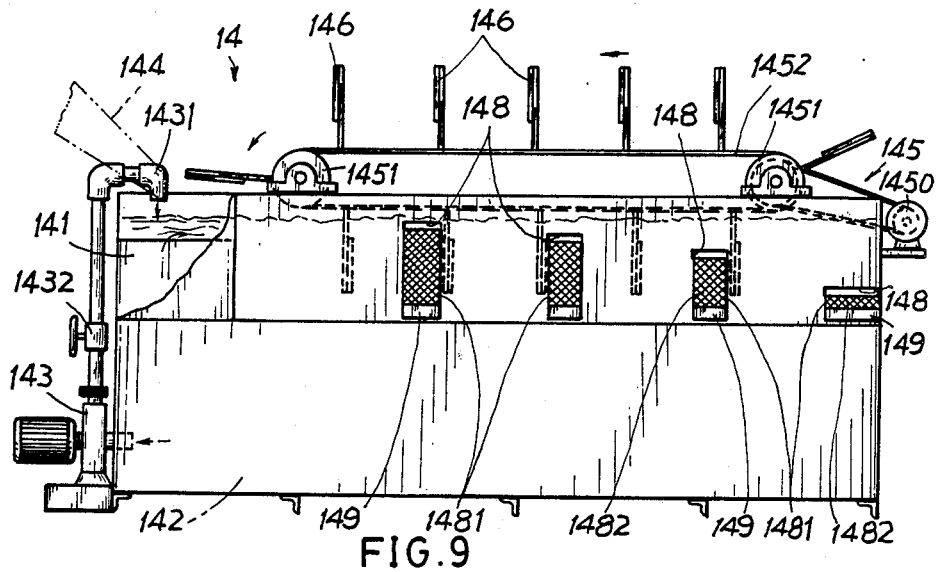

SYSTEMATIC EQUIPMENTS FOR RECYCLING RAW MATERIALS FROM WASTE WIRES

BACKGROUND OF THE INVENTION

U.S. Pat. No. 4,739,533 entitled "Machine for Scraping off the Plastic Coating of a Used Wire" of the same applicant of this application disclosed an apparatus comprising a low speed feeding roller provided with teeth thereon, and a high speed scraping roller mounted with steel brush wheels so that the pre-cut used wires are fed into the apparatus and the plastic coating is scraped off by the steel brush wheels to obtain substantially exposed copper wire.

However, the apparatus only provides the way for scraping plastic coatings from the insulated wires, from which the plastic coatings should be further separated from the stripped copper wires.

Accordingly, a set of systematic equipments for classifying and separating the copper, the ferrous material, and the different plastic materials is still expected and is then invented by the same applicant.

SUMMARY OF THE INVENTION

The object of the present invention is to provide a set of system equipments including: a charging conveyor, a cutter, at least a vertical conveyor, a quantitative distributing means, at least a vertical scraping machine, and at least a screening machine, a horizontal crushing machine, a magnetic separator, a copper and plastic material classifier and a wet gravity separator so that the waste wires can be scraped to remove their insulating plastic coatings and the copper, the ferrous material and the different plastic materials can be classified, separated and reclaimed for their re-uses.

BRIEF DESCRIPTION OF THE DRAWINGS

FIG. 6 shows a copper and plastic material classifier of the present invention.

FIG. 7 is a top view of the classifier as shown in FIG. 6.

FIG. 8 is a side view of the gravity separator of the present invention.

FIG. 8a is a top view of the gravity separator of the present invention.

FIG. 9 is a front elevation of the gravity separator of the present invention.

DETAILED DESCRIPTION

Figure 1:
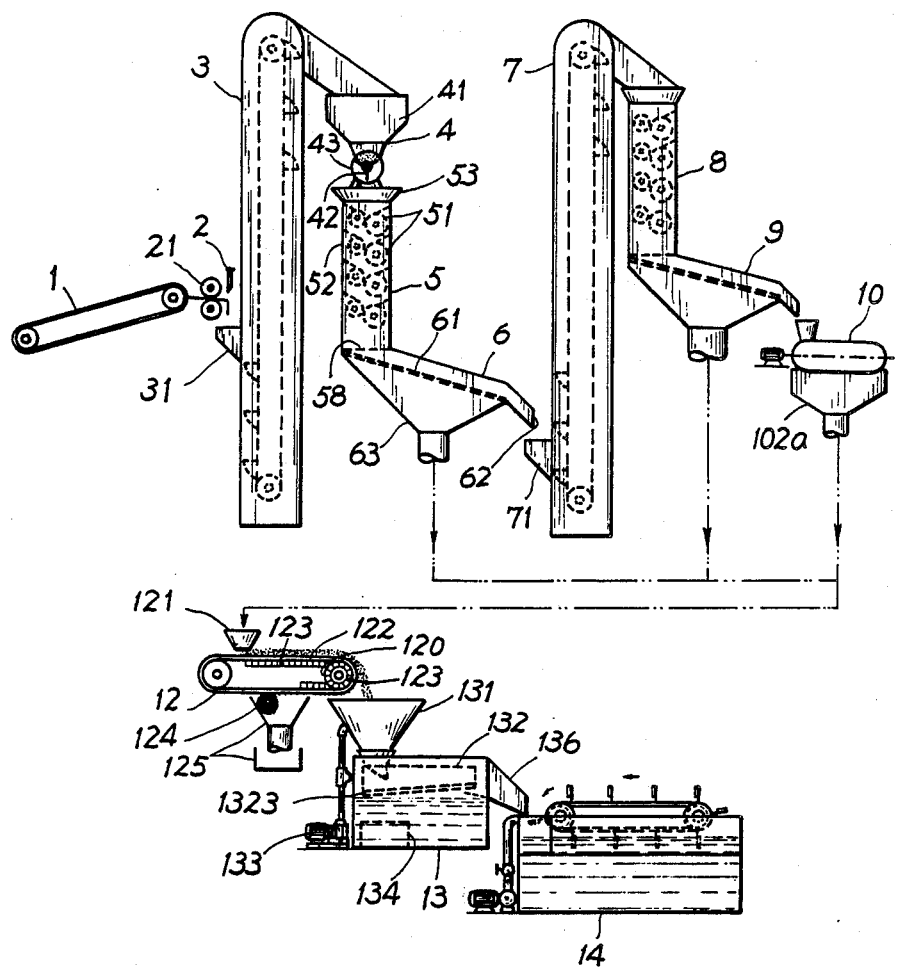
FIG. 1 shows a system for recycling the raw materials from the waste wires in accordance with the present invention.

As shown in the figures, the present invention comprises: a charging conveyor 1, a cutter 2, two vertical conveyors 3, 7, a quantitative distributing means 4, two vertical scraping machines 5, 8, two screening machines 6, 9, a horizontal crushing machine 10, a magnetic separator 12, a copper and plastic material classifier 13, and a wet gravity separator 14.

The charging conveyor 1 is provided to handle waste wires stacked or stored in a yard or site. The wires are cut in a predetermined length such as five inches for each wire piece or section by passing each wire through a pair of pressing rollers 21 are then cut by the cutter 2 as shown in FIG. 1. The pre-cut wire scraps are fed into chute 31 of the vertical conveyor 3 of which a plurality of buckets are rotatably conveyed to pour the wire scraps into a hopper 41 of the quantitative distributing means 4 which includes a trifurcate-blade valve 42 rotatably mounted in a cylindrical housing 43 so as to unload the scraps in a specific quantity defined between every two blades of the valve 42, into an upper chute 53 of the vertical scraping machine 5.

Figure 2:
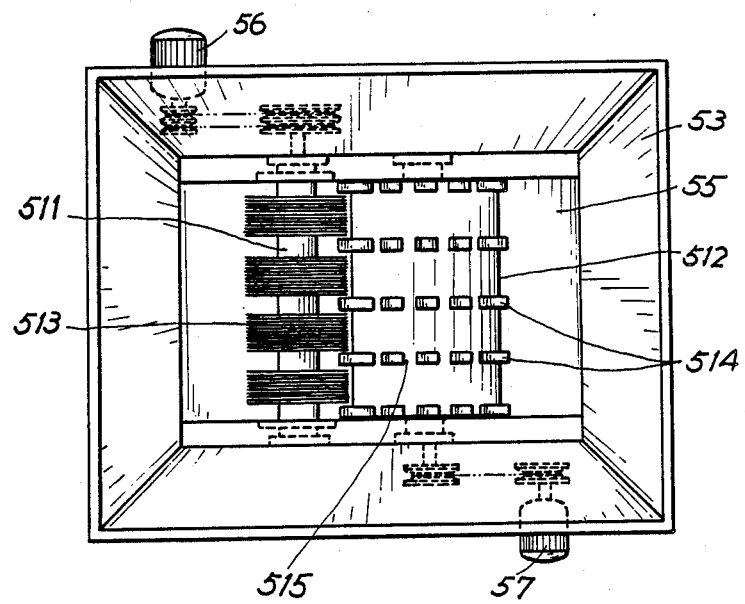
FIG. 2 is a top view showing the vertical scraping machine of the present invention.
Figure 3:
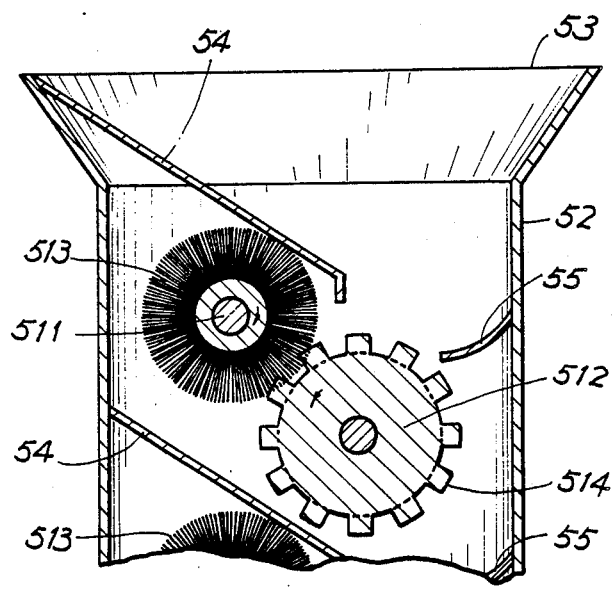
FIG. 3 is a partial elevation showing the vertical scraping machine of the present invention.

The vertical scraping machine 5 as shown in FIGS. 1, 2, 3 includes: a plurality of scraping-rollers set 51 vertically mounted in a vertical housing 52 having a cross section generally shaped as a rectangle, an upper loading chute 53, and a lower discharge port 58. Each scraping-rollers set 51 as applied in this invention may use the apparatus of U.S. Pat. No. 4,739,533 early issued to the same applicant, which includes a feeding roller 512 rotatably mounted in the housing 52 and driven by a low-speed driving motor 57 having a plurality of teeth 514 radially formed on a circumferential cylindrical surface of the roller 512, and a scraping roller 511 rotatably mounted in the housing 52 driven by a high-speed driving motor 56 in an opposite rotating direction to that of the roller 511 having a plurality of steel brush wheels 513 mounted on the scraping roller, each steel brush wheel 513 rotatably tangentially contacting a respective roller surface between every two neighbouring radial rows of teeth of the feeding roller 512 so that the plastic coating of a wire as conveyed by the feeding roller will be scraped by the steel brush wheels. A plurality of stories for vertically erecting the plurality sets of the scraping roller 511 with the feeding roller 512 are formed as shown in FIGS. 1 and 3, each story including an upper guard board 54 and a lower guard board 55 for guiding and feeding the wire scraps into the axial grooves 515 formed between two radial rows of teeth to be scraped by the brush wheels 513. The scraps unloaded from the upper story will fed into a lower story of continuously scraping operation, thereby thoroughly scraping off the plastic coatings on the cutting wires.

The screening machine 6 includes: an inclined screen 61 for screening off the fine scraps (whereas the coarse scraps or longer stripped wires are still kept on the screen and the stripped wires may be manually picked up, a bottom funnel 63 and an unloading chute 62 formed on a lower side portion of the screening machine 6 for discharging the coarse scraps into second set of second vertical conveyor 7 having a loading chute 71, a second vertical scraping machine 8 and a second screening machine 9 for a complete scraping operation.

The fine scraps may be unloaded into a hopper 121 of the magnetic separator 12 as shown in FIG. 1 from the bottom funnel 63 of the screening machine 6 for further processing operations. The magnetic separator 12 includes: a hopper 121, a horizontal conveyor 122 having magnets 123 fixed on a frame positioned inside the conveyor and fixed in a perimeter inside the conveyor rollers 120 for magnetically attracting the ferrous materials from the scraps containing copper and plastic material unloaded from the screening machine 6 and from the horizontal crushing machine 10, and a collector having a scraping wheel 124 for scraping off the ferrous material from being attracted by the magnets 123. The copper and plastic materials not attracted by the magnets 123 will be unloaded into a hopper 131 of classifier 13 for next treatment.

Figures 4, 5:
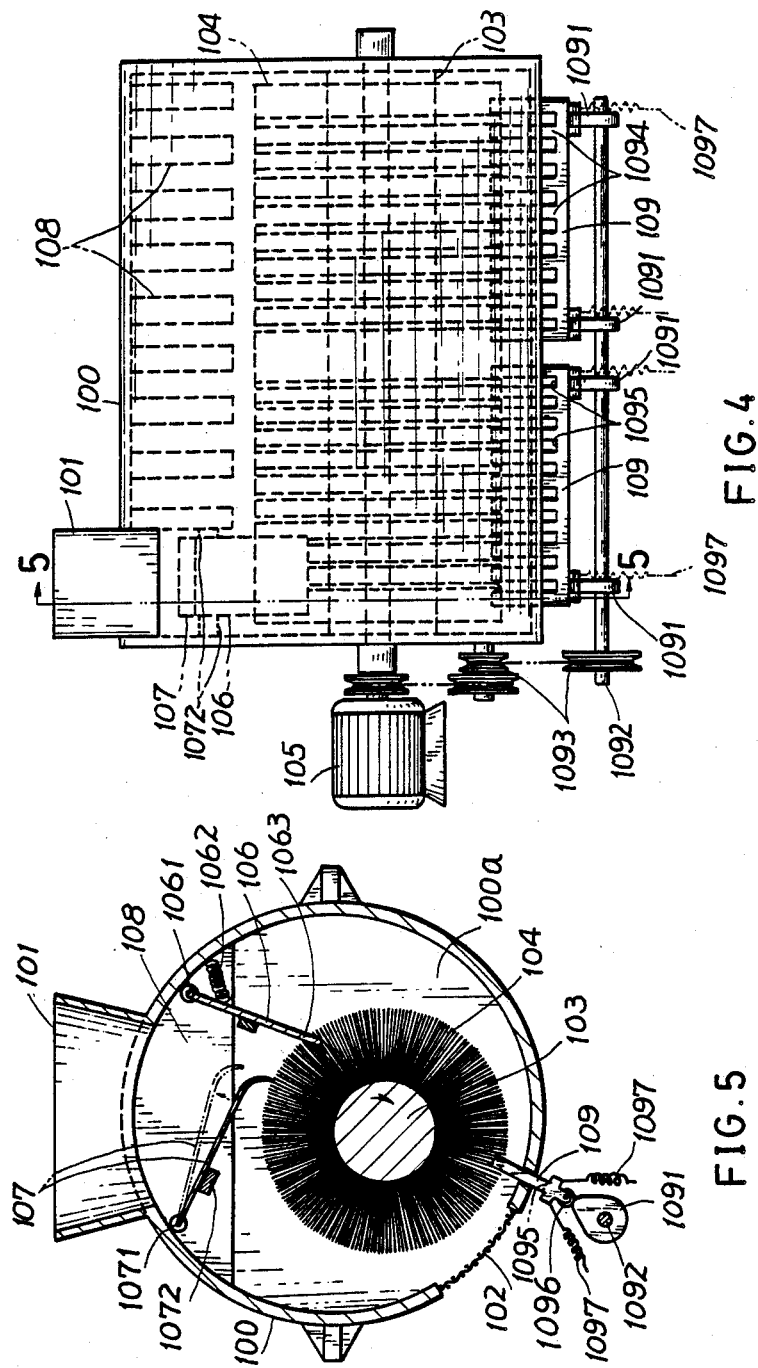
FIG. 4 is an illustration showing the horizontal crushing machine of the present invention.
FIG. 5 is a cross sectional view of the crushing machine as shown in section 5—5 of FIG. 4.

The horizontal crushing machine 10 as shown in FIGS. 1, 4, 5 includes: a horizontal cylindrical housing 100, an upper loading chute 101 formed on an upper front portion of the housing 100 for receiving coarse scraps discharged from the screening machine 6 or 9, a lower discharge port 102 having a net of fine mesh for filtering off the fine pieces as crushed by the crushing machine 10, a lower hopper 102a for collecting and discharging the crushed particles of the scraps into a hopper 121 of the separator 12, a crushing roller 103 rotatably mounted in the housing 100 having a plurality of steel brush crushing wheels 104 radially mounted on the roller 103 and driven by a crusher motor 105, a lower guide plate 106 and an upper guide plate 107 respectively controlling the feed capacity of the scraps into the machine 10, a plurality of secant scroll sections 108 consecutively formed in an upper dome portion inside the cylindrical housing 100 for guiding the input scraps rearwardly throughout a length of the crushing roller 103, and a plurality of striking plates 109 longitudinally formed on a lower portion of the housing 100 operatively reciprocatively tangentially contacting the plurality of crushing wheels 104 or releasing from the crushing wheels 104 for discharging the fine particles through the port 102.

The striking plates 109 are reciprocatively driven by a plurality of cams 1091 having a shaft 1092 driven by a gear set which is driven by the motor 105. Each striking plate 109 includes a plurality of parallel teeth 1094 and a plurality of recesses 1095, each recess 1095 defined between every two neighbouring teeth 1094 and tangentially contacting each steel brush crushing wheel 104 mounted on the crushing roller 103. The lower guide plate 106 has its upper end portion 1061 pivotally secured to the housing 100 and normally urged by a restoring spring 1062 to bias a lower end portion 1063 to tangentially contact the crushing wheels 104 so that the spring 1062 will urge the plate 106 to temporarily hold the scraps until the accumulated scraps reaches a suitable quantity to gravitationally push (open) the plate 106 downwardly also by the aid of the rotating roller 103 in order to allow the scraps to enter a crushing chamber 100a. The clockwise rotation of the roller 103 as shown in FIG. 5 to tangentially contact the steel brush wheels 104 with the teeth 1094 of the striking plates 109 will crush the scraps into fine pieces or particles containing copper, ferrous material and plastic materials which will leave from the plates 109, when the plates 109 are retracted by the tensioning springs 1097 as the backward rotation of cams 1091, to discharge through the lower port 102. The further rotation of cams 1091 will push the bearings or rollers 1096 of striking plates 109 to poke the plates 109 inwardly to tangentially contact the wheels 104 for crushing operation.

The upper guide plate 107 has its upper end portion 1071 pivotally secured in the housing 100 opposite to the lower plate 107 and positioned under the chute 101, and has its lower end portion to be adjacent to the crushing wheels 104 and limited by a stopper 1072. If the scrap quantity in the crushing chamber 100a is too much, the scraps coming to the left side of the chamber 100a will bias the plate 107 upwardly as shown in an arrow direction of FIG. 5 to temporarily hold the scraps above the two plates 107, 106 without dropping into crushing chamber 100a, thereby enabling an automatic adjustment for feed rate control.

The copper and plastic material classifier 13 as shown in FIGS. 1, 6 and 7 includes: an upper hopper 131 provided with a water-spray pipe 1311 having a plurality of holes formed therein for spraying water for draining the fine particles from the previous processing steps into the classifier as controlled by a slide valve 1312, a floatation vibrator 132 reciprocatively shaking in the classifier tank 135, a water circulation pump 133 having an inlet pipe 138 poking into a bottom portion of the tank 135 for sucking water therefrom and a flexible hose 1331 connected to vibrator 132 for delivering water into vibrator and a vertical pipe 1332 connected to water-spray pipe 1311 for delivering water into hopper 131, a collection basket 134 positioned under the vibrator 132 inside the tank 135 for collecting reclaimed copper therein, and a discharge chute 136 having filter mesh formed therein for filtering off water from the reclaimed plastic materials overflowing from the vibrator 132 for discharging into wet gravity separator 14.

The floatation vibrator 132 includes an elongate trough 1320 having a bottom portion of double plates 1321, 1322 defining a bottom jacket 1321a and having a slope with a deeper front portion near the front side of the hopper 131 and a shallow rear portion near the discharge chute 136 remote from the hopper 131, a front drain hole 1323 formed in a front bottom portion of the trough 1320, and a weir 1324a formed on a rear gate 1324 formed on a rear end of the trough 1320 for overflowing the classified floating plastic materials into chute 136, a vibrator motor 1325 having a crank 1326 linked between a motor shaft and the front end portion of the trough 1320 for reciprocatively shaking the vibrator 132 having supporting rollers 1327 rotatably mounted under the bottom plate 1321 and slidably moving on an inclined rail 1328 secured to the tank 135. The water sprayed from the hose 1331 boosted by the pump 133 will float the lighter plastic materials on a water level in the trough 1320 to overflow from rear weir 1324a, whereas the heavy copper will sink onto a second bottom plate 1322 formed slightly above a first bottom plate 1321 during the shaking of the vibrator 132, which copper material will be gravitationally dropped into the jacket 1321a between the first and second bottom plates 1321, 1322 through the slots 1322a formed in the second plate 1322 and finally discharged from the drain hole 1323 to be collected by the basket 134 positioned under the hole 1323 of the vibrator 132.

The wet gravity separator 14 as shown in FIGS. 9, 8, 8a includes: an upper floatation tank 141, a lower main tank 142 supporting the upper tank 141, a circulation pump 143 sucking water from the lower tank 142 having a discharge outlet 1431 for pumping water into the upper tank 141, partitioned from the lower tank 142, an upper chute 144 for receiving mixed plastic materials from the classifier 13, a paddle conveyor 145 having a plurality of paddles 146 longitudinally fomred on a chain 1452 driven by a pair of gears 1451 formed on two end portions of the upper tank driven by a motor 1450 which paddles 146 recirculatively moving in the upper water tank 141 for agitating and forwarding the plastic particles or powder in the tank 141 rearwardly, and a plurality of overflow slots 148 formed in a side wall 147 of the upper tank 141 which slots 148 are subsequently formed in the wall 147 from a highest position proximate to the front portion of the tank 141 towards a lowest position at the rear portion of the tank 141, the heights of the slots 148 depending upon a density gradient of the different plastic materials scraped from the copper wires.

Each overflow slot 148 is connected with a spout 1481 having a filter 1482 formed on its bottom portion for filtering off the water on the plastic particles, and a side discharge chute 149 protruding outwardly from a side wall of the lower main tank 142 for collecting classified plastic materials with respective to their different densities. By means of the gravity separator 14, the density of one plastic material is different from that of another plastic material so that the floating heights of the different plastic materials in the upper tank 141 will be easily classified for clearly separating the different plastic materials. As shown in FIG. 8a, two sendimentation chambers 141a, 141b are provided in the upper tank 141 for pre-settling the heavier dust before coming into the floatation tank agitated by the paddles 146. Each chamber 141a, 141b is formed with a weir for overflowing water stream laden with plastic powder. By controlling the valve 1432, a water level in the upper tank 141 can be maintained for floatation separation of plastic materials.

Other methods and equipments for agitating or forwarding the plastic materials in the floatation tank 141 may also be used in this invention.

For preventing air pollution of the present invention, a water scrubber system or other dust collectors or precipitators (not shown) may be further used for collecting those dusts laden in the air spread from the equipments exposed to the air.

The present invention for scraping the "plastic material" as aforementioned may also be used for scraping the coating materials coated on any insulating copper wires, which coating materials may be a plastic, a rubber or any other non-metallic coating materials.

I claim:

1. A set of systematic equipments for recycling raw materials from waste wires comprising:
    a charging conveyor handling waste wires having a cutter for cutting each waste wire in a predetermined length;
    at least a vertical conveyor for carrying cut waste wires upwardly and unloading into a quantitative distributing means from a top portion of the vertical conveyor;
    at least a vertical scraping machine having a plurality of scraping roller set consecutively vertically mounted in a vertical housing of said vertical scraping machine for scraping off plastic coatings of insulated copper wires;
    at least a screening machine for filtering off fine wire scraps and for picking up stripped copper wire sections from an inclined screen formed in said screening machine;
    a horizontal crushing machine receiving coarse wire scraps from said screening machine and crushing the scraps into particles or powder of copper, ferrous material and plastic materials;
    a magnetic separator receiving the materials from said horizontal crushing machine and magnetically attracting the ferrous material to be separated from the copper and plastic materials;
    a copper and plastic material classifier separating copper and plastic materials discharged from the magnetic separator; and
    a wet gravity separator gravitationally classifying and separating the different plastic materials from said copper and plastic material classifier, depending on different densities and floating heights of the different plastic materials floating in a water stream in said gravity separator.

2. A set of systematic equipments for recycling raw materials from waste wires according to claim 1, wherein each said scraping roller set includes a feeding roller rotatably mounted in said vertical housing of said vertical scraping machine having a plurality of teeth radially formed on a circumferential cylindrical surface of said feeding roller;
    and a scraping roller rotatably mounted in said vertical housing opposite to said feeding roller having a plurality of steel brush wheels radially formed on said scraping roller each said brush wheel rotatably tangentially contacting a roller surface between every two neighbouring teeth of said feeding roller for scraping off plastic coating of the waste wire.

3. A set of systematic equipments for recycling raw materials from waste wires according to claim 1, wherein said horizontal crushing machine includes: a horizontal cylindrical housing having an upper chute for feeding scraps therein formed on an upper front portion of the cylindrical housing, a crushing roller rotatably mounted in said cylindrical housing having a plurality of steel-brush crushing wheels radially formed on a circumferential surface of said crushing roller, a plurality of striking plates each said striking plate having a plurality of parallel teeth longitudinally formed on a lower portion of said cylindrical housing operatively reciprocatively moving inwardly for tangentially contacting said crushing wheels of said crushing rollers for crushing wire scraps into powders of copper, ferrous material and plastic materials, and reciprocatively retracting outwardly to release the crushed powders to be discharged from a lower port formed in a bottom portion of said crushing machine.

4. A set of systematic equipments for recycling raw materials from waste wires according to claim 1, wherein said copper and plastic material classifier includes: a classifier tank having a hopper formed on an upper front end portion of said tank and having an overflow discharge chute formed on a rear end portion of said tank, a floatation vibrator reciprocatively formed in said tank, a water circulation pump sucking water from a bottom portion of said tank and having a flexible hose connected to said vibrator for spraying water into said vibrator for floating plastic materials in said vibrator and having a water-spray pipe for spraying water into said hopper for draining materials into said vibrator, and a collection basket positioned under said vibrator in said tank for collecting copper as dropped from said vibrator.

5. A set of systematic equipments for recycling raw materials from waste wires according to claim 4 wherein said floatation vibrator includes:
    an elongate trough reciprocatively moved in said classifier tank having a deep front end portion near the hopper and a shallow rear end portion near the discharge chute, a double-plate bottom portion having a first bottom plate formed on a bottom of said trough having a plurality of supporting rollers formed under said first bottom plate slidably moving on an inclined rail secured in said classifier tank, a second bottom plate slightly positioned above said first bottom plate having a plurality of slots formed in said second bottom plate for passing copper material from said second bottom plate into a jacket defined between two said bottom plates, and a bottom drain hole formed in a front bottom portion for draining copper into said collection basket, and a weir formed on the rear end portion for overflowing plastic materials laden on a water stream sprayed into said trough into said discharge chute.

6. A set of systematic equipments for recycling raw materials from waste wires according to claim 1 wherein said wet gravity separator includes:

an upper floatation tank, a lower main tank supporting said upper floatation tank, a circulation pump operatively sucking water from the lower tank and delivering the water into the upper tank, an upper chute formed on an upper front portion of said upper tank for receiving mixed plastic materials from said classifier, a paddle conveyor having a plurality of paddles recirculatively moving in the upper tank for agitating and forwarding the plastic materials in said upper tank rearwardly, and a plurality of overflow slots subsequently formed in a side wall of the upper tank, said overflow slots having different heights depending upon a density gradient of the different plastic materials scraped from the waste wires.

* * * * *